Jan. 5, 1960  G. T. McCONNELL  2,919,580
TEMPERATURE MEASURING AND INDICATING MEANS
Filed July 7, 1955  4 Sheets-Sheet 1
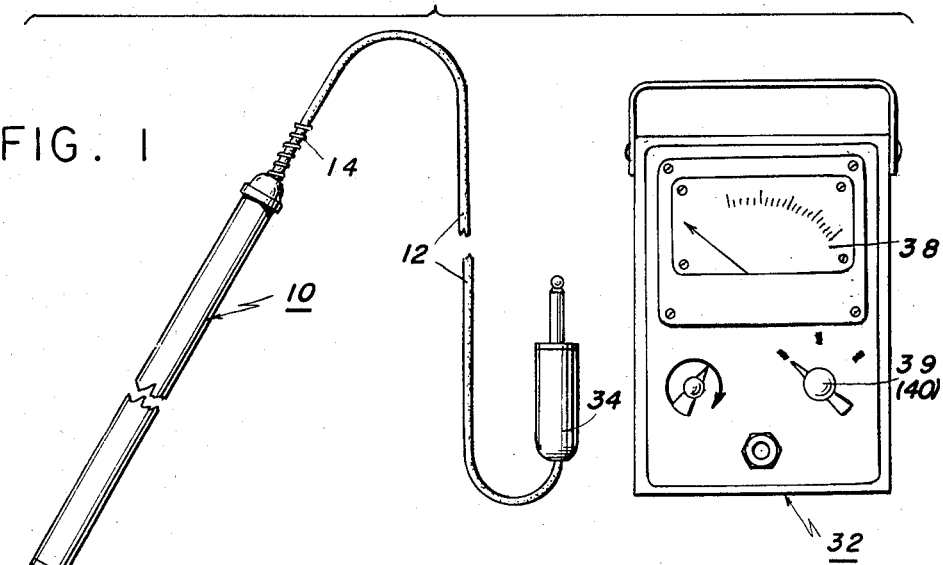
FIG. 1
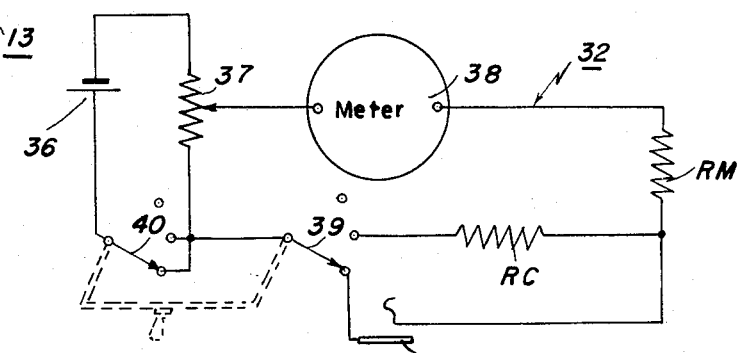
FIG. 6
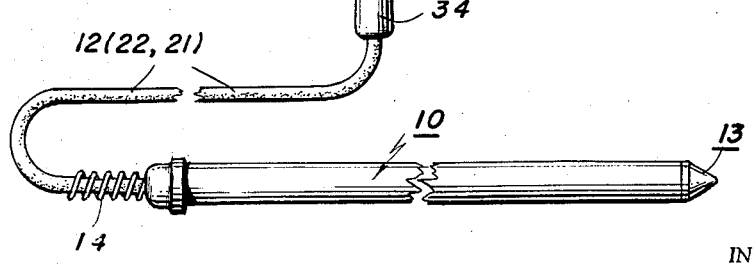
INVENTOR
GEORGE T. McCONNELL
BY
ATTORNEY

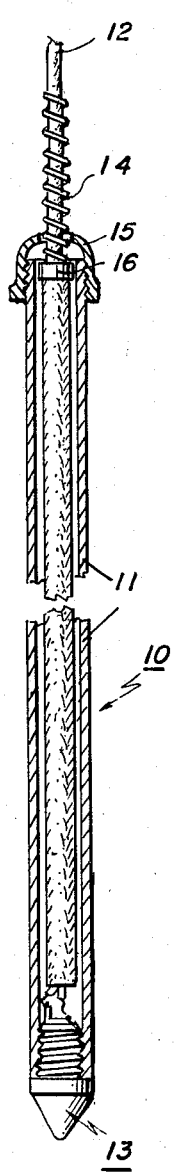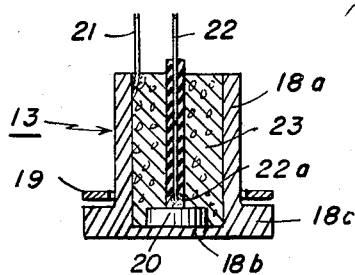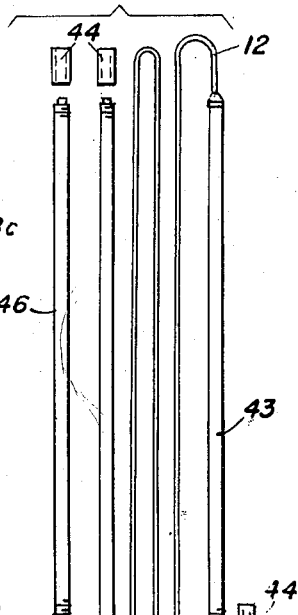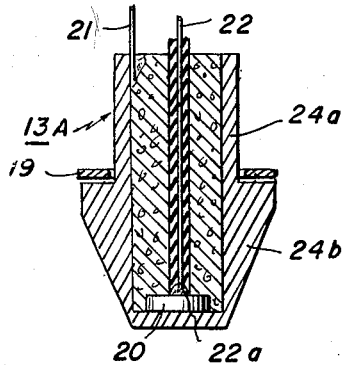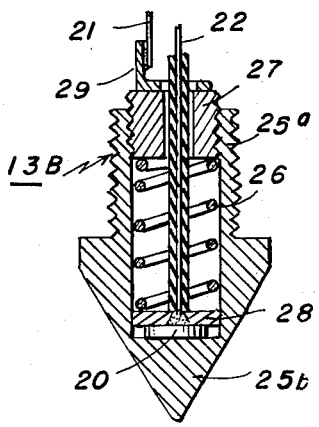

Jan. 5, 1960 G. T. McCONNELL 2,919,580
TEMPERATURE MEASURING AND INDICATING MEANS
Filed July 7, 1955 4 Sheets-Sheet 3

INVENTOR
GEORGE T. McCONNELL
BY *Harold Kieserbe*
ATTORNEY

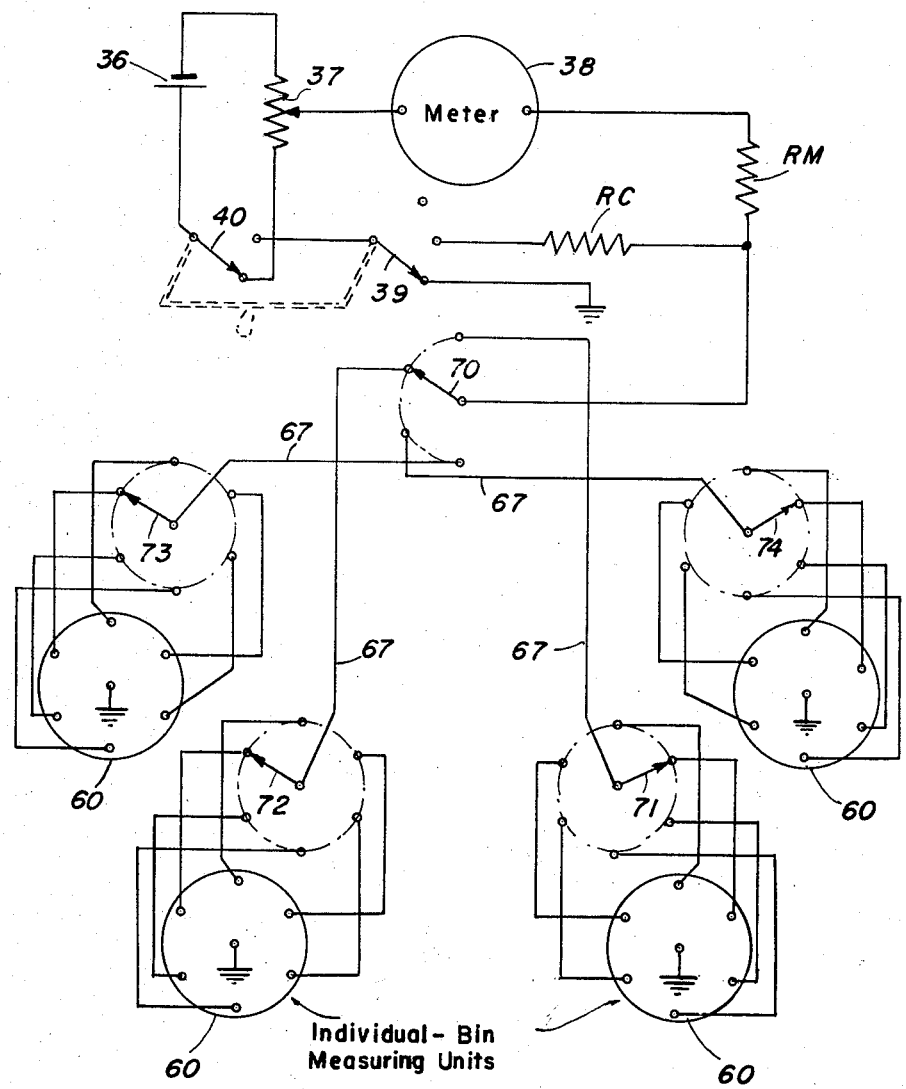

United States Patent Office 2,919,580
Patented Jan. 5, 1960

2,919,580

TEMPERATURE MEASURING AND INDICATING MEANS

George T. McConnell, Millington, Tenn., assignor to Tell-Tronics Products, Inc., Memphis, Tenn., a corporation of Tennessee Application July 7, 1955, Serial No. 520,397

7 Claims. (Cl. 73—362)

This invention relates to temperature measuring and indicating means, and more particularly to improved means for measuring the temperature of grains, seeds and fertilizers, and other bulk and/or combustible materials while in storage and for indicating same at a distance.

There are numerous bulk or granular materials whose internal temperature during storage must be carefully monitored to guard against spoilage or spontaneous combustion. To cite an example and not by way of limitation, it is well known that when rice is stored in bins its internal temperature, i.e. the temperature obtaining within the mass or body of the rice, becomes an important factor both in preserving the germinating properties of the rice and in protecting it against fermentation. Such follows from the fact that when stored in bins rice (which has been previously dried at a closely controlled temperature) has a tendency to "sweat" with changes in outside temperature and humidity. These sweating periods are dangerous because, with rice, a high moisture content is accompanied by a rise in temperature which can be sufficiently great as to cause the rice to ferment and thereupon to become useless.

With other grains in storage a temperature rise is usually accompanied by a rise in moisture content. Therefore, periodic measurement of the internal temperatures of such grains gives an indication of the relative condition thereof in terms of this moisture content. Thus, it is customary practice for commercial mills and grain elevators to log the internal temperature of grains stored in its bins at regular intervals, say every twenty-four hours, and, as the temperature of a certain bin may rise to an unsafe level (95° in the case of rice), to put grains stored therein through a drier to remove the excess moisture.

However, so far as I have been able to determine, there is on the market no temperature measuring and indicating device suited, as respects its self-contained construction and portability, to the needs of the individual farmer in monitoring the temperature of his grains in storage. Furthermore, the permanently installed temperature measuring and indicating means as heretofore used by commercial mills and elevators to periodically log the temperature of the grains stored in its bins as aforesaid leave much to be desired in terms of accuracy of measurement and simple and efficient construction.

Stated broadly, a main object of the present invention is the provision of an improved, simplified and highly effective means for obtaining an accurate indication of the internal temperature of masses of bulk (granular or pulverized) material in storage in bins, piles or the like.

A further object of the invention is the provision of a portable instrument-type of means for measuring the internal temperature of materials such as grains, seeds or the like under storage in bins, thus enabling the individual farmer (owner) to monitor his own bins at regular intervals suited to his convenience or to the particular material or materials in storage.

Yet a further object of the invention is the provision of a portable temperature measuring and indicating means as last stated which is of self-contained construction, thus enabling its use on farms whose storage bins may be remotely located from a power supply, for example.

Another object of the invention is the provision of temperature measuring and indicating means of the stated character, which combines a temperature measuring element in the form of a probe adapted to be manually inserted into grains and like materials in storage bins, with a temperature indicator in the form of a meter, which latter may be located remotely from the probe.

A still further object of the invention is the provision of an improved temperature measuring and indicating means for measuring and indicating the temperature of grains and similar materials in storage, whose construction and arrangement is such that it may be permanently installed in bins, grain elevators, and the like.

Still another object of the invention is the provision of temperature measuring and indicating means as last stated, which may employ a plurality of temperature measuring elements located, for example, at different levels in each of a plurality of grain storage bins, combined with a console-type indicating means for indicating the temperature of the grain at the various bin levels at a common indicating station, such as the mill or elevator office.

A more particular object of the invention is the provision of an improved temperature measuring head capable of accurately sensing the internal temperature of grains and like materials in bins, piles and the like when inserted or buried in said materials.

The above and other objects and advantages of a temperature measuring and indicating means according to the invention will appear from the following detailed description thereof, reference being had to the accompanying drawings wherein Fig. 1 is a plan view of a portable self-contained temperature measuring and indicating means according to one form of the invention, which employs a fixed-length temperature sensitive probe member shown to be unplugged from the meter or indicator thereof;

Fig. 2 is a broken-away longitudinal section through the probe member shown in Fig. 1;

Figs. 3, 4 and 5 are enlarged broken-away longitudinal sectional views illustrating different forms of temperature sensitive probe head for use in a probe member as herein proposed;

Fig. 6 is a circuit diagram of the meter and temperature sensitive probe member components of temperature measuring and indicating means as illustrated in Fig. 1;

Fig. 7 is a plan view of the separate parts making up a variable-length form of temperature sensitive probe member according to the invention;

Fig. 12 is a circuit diagram of a console-type temperature indicator or meter shown to be electrically connected to the different level temperature sensitive heads mounted as shown in Figs. 10 and 11, a plurality of such mountings, one for each of a plurality of storage bins, being assumed.

Figure 8:
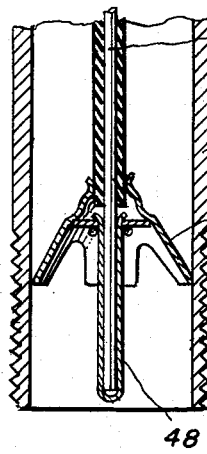
Figs. 8 and 9 are enlarged longitudinal sectional views taken through the adjacent or meeting ends of the probe sections which illustrate a preferred form of electrical connector between said sections.

Referring to Figs. 1–5 exemplary of a portable probe-type temperature indicating and measuring instrument according to the present invention, reference numeral 10 generally indicates a portable probe member capable of being manually inserted into a body or pile of bulk material, such as grain in storage, and which preferably comprises a length of standard one-quarter inch black pipe 11 (Fig. 2) enclosing a twin lead, rubber-sheathed cable 12 which connects to a temperature sensitive probe head generally designated 13 and affixed to one end of said pipe so as to project beyond same. A coil spring 14 disposed to encircle the cable 12 as it enters the pipe and serving to protect said cable against the effects of sharp bending is connected to the other end of the pipe 11 as by a cap 15 which also closes off and seals said other end. A cable clamp 16 which may be locked in place by the cap prevents the cable 12 from being pulled out from the pipe 11.

Figs. 3, 4 and 5 illustrate various forms which the aforesaid temperature sensitive head 13 may take, with all such forms being characterized in common by a shell-like body member adapted for securement to the tip end of pipe 11 and being made of a metal having good heat-conducting properties, and by a disc thermistor contained in said shell and being disposed in both physical, i.e. heat-exchange, and electrical contact therewith. More particularly, the temperature sensitive head 13 shown in Fig. 3 comprises a shell made of copper having a shank or body portion 18a whose diameter is slightly less than that of the inner diameter of the bore of the pipe 11 and a closed end 18b shown to be extended radially as by a large-diameter flange 18c, which latter is adapted to abut the lower end-edge of the pipe 11. A fiber washer 19 interposed between said flange 18c and the end edge of the pipe serves to insulate the copper head 13 from the mass of metal in pipe 11, thus to prevent heat dissipation away from said copper head. In securing the head to the pipe, preferably a cement which does not conduct heat is applied between the shell or body portion 18c of the head and the interior surface of the pipe, such also serving as a heat barrier between the head and the pipe.

The aforesaid thermistor which is designated 20 rests flush against the inner surface of the end wall 18b so as to be in physical and hence heat exchange relation therewith. One of the twin leads designated 21 is soldered to the copper head 13, and the other (insulated) lead 22 is electrically connected to the thermistor 20 by means of a solder connection 22a therewith. Accordingly, in addition to the thermistor 20 being in heat-exchange relation with the head 13, it is also electrically connected to and in an electrical circuit including said head. Preferably, the thermistor 20 and lead 22 connecting therewith are set in place within the interior of the head shell 18a by means of a filling 23 of non-conducting cement. Thus, it will be appreciated that any change in temperature of the copper head 13 results in a corresponding change in the temperature and hence in the electrical resistance of the thermistor 20, with such latter change following almost instantaneously the change of temperature of said head.

The temperature sensitive probe head 13A illustrated in Fig. 4 is essentially the same as that shown in Fig. 3 except for the shape of and the material making up its shell component 24a. Said shell in the Fig. 4 form of head is made of aluminum, and its end 24b which projects beyond the pipe 11 is formed as a truncated cone whose smaller diameter end is adapted to be pointed away from the end of said pipe. Such shaping of the head makes for its easy insertion into a mass or body of grain or similar materials maintained in storage in a bin or the like.

Fig. 5 depicts yet another form of temperature sensitive head 13B characterized in that its shell or case 25a is made of brass and is provided with a sharply pointed end 25b which further facilitates its manual insertion into grain bins, for example. Also, in the Fig. 5 form of probed head, the thermistor 20 is shown to be held in physical and electrical contact with the end wall of the head by means of a spring 26 reactive between a closure plug 27 screw-threaded into the open end of the shell 25a and an insulating wafer 28 placed directly against the thermistor so as to hold it firmly in contact with the closed end of the shell. The lead 22 extends through the wafer 28 and may be soldered at its lower end to the thermistor as previously described, but the return lead 21 is preferably soldered to an attaching prong 29 of conductive metal soldered or otherwise secured to the aforesaid plug 27. The shank or tubular portion of the head shell 25a may be externally threaded to match internal threads cut into the lower-end bore surface of the pipe 11, thus permitting the head to be secured to the pipe simply by screwing it as a unit into the pipe end.

As seen in Fig. 1, the temperature sensitive probe 10 is adapted to be plugged into and thereby electrically connected to a portable electrical indicator or meter generally designated 32 and which is preferably of the type giving a temperature reading on its face directly in degrees Fahrenheit. To enable the probe to be plugged into and disconnected from the meter at will, the cable 12 terminates in a plug 34 and the meter is provided with a jack or receptacle 34a (Fig. 6) therefor. It is a further feature of the invention that the meter 32 suitably mounts and encloses the source of power required to energize the device, so that it is not only portable but also it is fully self-contained and hence may be used in locations removed from a conventional power source.

The electrical construction of the meter 32 will be seen from Fig. 6, such being a circuit diagram thereof. The source of power is a single 1.5-volt standard flashlight cell 36 and, when the switches 39 and 40 (which are ganged to change position simultaneously) are in the "On" position, the output of the battery is fed through a calibrating potentiometer 37, thence through the 0–1 milliammeter 38, thence through resistance RM (which represents the meter resistance), thence through jack 34a and plug 34, thence through lead 22 of cable 12 to the thermistor 20 located in the probe head 13, thence through the return or common lead 21 (Figs. 3–5) to said plug and jack, thence through the aforesaid switches 39 and 40, and back to the positive side of the battery. Means are also provided to calibrate the meter when the switches 39 and 40 are moved to the "CAL," i.e. calibrating, position, in which the temperature sensitive probe 10 is cut out of the circuit and a calibrated resistor RC is substituted in series therefor. Calibrated resistor RC is a wire wound resistor whose selected resistance of 735 ohms, plus or minus 1%, represents the resistance of the type thermistor used, at 90° F. When switches 39 and 40 are in the "CAL" position aforesaid, current flow is from battery 36 through calibrating potentiometer 37, thence through meter 38, thence through meter resistance RM, thence through the calibrating resistor RC, thence through switches 39 and 40, to the other side of the battery. With current flowing as above, the potentiometer is adjusted for the proper current flow in the circuit. When switches 39 and 40 are switched to the "Off" position, all power is removed from the circuit.

Illustratively, the thermistor 20 is of a type whose resistance decreases substantially linearly from 2580 to 372 ohms with increase in thermistor temperature from 40° F. to 120° F. Such a thermistor has a negative temperature coefficient and changes resistance at an exponential rate. The tolerances of the components used in the Fig. 6 circuit are designed to give an accuracy of plus or minus 1% from 70° F. to 110° F.

While the temperature sensitive probe member 10 according to the Figs. 1–5 form is shown to have fixed length, illustratively, seven feet, said probe member may have extensible construction, and for this purpose may be composed of a plurality of pipe sections capable of being mechanically connected in end-to-end relation and also electrically connected as well. Fig. 7 illustrates the five basic elements of one such extensible probe member, consisting of four sections of pipe corresponding generally to the pipe 11, and one cable (corresponding to the cable 12) which is connected to the inner or handle-end section of the pipe. Of said sections, tip section designated 42 mounts a temperature sensitive head 13 at one end and a female connector (to be described) at the other, the length of said section being, illustratively, three feet. Another section designated 43 to which the cable 12 connects and which is also three feet long, illustratively, mounts a cap 15 at one end and a male connector (to be described) on the other. The two sections 42, 43 may be jointed as by a coupling or union 44 to make a six-foot portable probe. A third section designated 45, having a six-foot length, for example, is provided with a male connector at one end and a female connector at the other and may be interposed between the aforesaid pipe sections 42 and 43 and connected thereto by couplings 44, thus to build up the length of the probe to twelve feet. The last of the four sections which is designated 46, illustratively has three-foot length, and, like the section 45, has a male connector at one end and a female connector at the other. Thus, the section 46 may be inserted between sections 42 and 43 and secured as by couplings 44 to make up a nine-foot probe, or both sections 45, 46 when connected to one another may be interposed between and connected to said sections 42 and 43, thus to build up a fifteen-foot probe.

Figure 9:
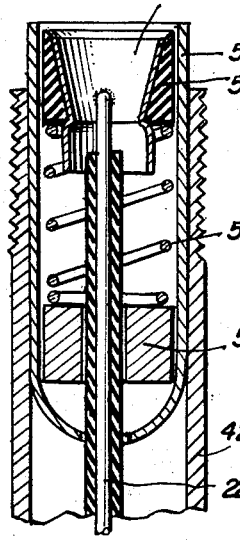

The aforesaid male and female connectors referred to above are preferably of the type illustrated in Figs. 8 and 9, respectively. Preliminary to a description of said connectors, it is to be noted that the pipe sections 42, 43, 45 and 46 are each preferably of standard three-eighths inch black steel pipe, the pipe itself acting as one of the conductors and hence being connected to the common wire 21 of the cable 12. Referring to Fig. 8 illustrating the male connector as used on the sections 43, 45 and 46, the other lead 22 (or a corresponding partial lead 22x built into said sections) connects to a male plug 48 which is held centrally in the pipe ends and in axial position such that it terminates flush with the end line of its pipe section by means of a spring-finger type of friction fitting 49 acting against the interior surface of the pipe section end. Secured by friction into the opposite end of the next pipe section is a steel connector case 50, the axial position of the latter being such that approximately a half-inch length of the case projects axially from the end of the pipe section toward the male connector. The lead 22x (corresponding to the aforesaid lead 22) is soldered at its upper end into the base of a conical or cupped copper receptacle 51 which extends from the pipe section similarly to said case 50, being mounted in a holder 52 of insulating material such as Bakelite. The aforesaid receptacle 51 and its holder 52 are spring mounted, being in effect supported on coil spring 53 which encircles the lower end of the receptacle and is reactive between the Bakelite holder 52 and a fixed spring mount 54 contained in the case 50 and located near its lower closed end. Thus, when the pipe ends according to Figs. 8 and 9 and which correspond to the male and female ends of any two of the pipe sections to be electrically connected are brought together, the plug 48 contacts the copper receptacle 51 and/or the end of the lead 22x connected thereto and thereby compresses the spring 53, which latter, when in compression, tends to force the receptacle into good electrical contact with the plug 48.

With the constructions so far described, it will be appreciated that the invention provides a portable and self-contained probe type device for measuring and indicating the internal temperature of masses of material maintained in storage bins or in piles, as suits the needs of individual farmers, bin owners and storage pile owners. Being of lightweight construction, both probe and meter components may be moved about from place to place as required, and a measurement taken merely by manually inserting the probe into the mass or pile. Moreover, through the use of a thermistor, as distinguished from the more conventional types of resistors, as the temperature sensitive element and by the mounting thereof within and in physical and electrical contact with a head of metal having good heat-conductive properties as described, an accurate sensing of the internal temperature obtaining within the mass or pile of material is insured, while at the same time the thermistor is fully protected. In cases where the masses or piles of the material whose internal temperature is to be measured have substantial areas or said areas vary substantially, the extensible probe as illustrated in Figs. 7–9 gives excellent results, as its construction enables the length of the probe to be varied between substantial limits, such as between six and fifteen feet.

In addition to serving in highly satisfactory manner as a fully portable temperature measuring and indicating means, i.e. one which is movable from bin to bin, such means may also be used much as a permanent installation, as by leaving a probe member 10 or at least its temperature sensitive head 13 buried in the material of a bin, and electrically connecting the meter 32 thereto when a temperature reading is desired. In case a plurality of storage bins are involved, one probe per bin would be employed, while but a single meter 32 would be required to service all of the probes in succession or any desired one thereof. However, for the permanent installation, a single temperature sensitive head of the type shown in Figs. 10 and 11 is recommended, one such head per small bin, or a plurality of such heads mounted at different levels on a common pipe or other support, in the case of a large or commercial size storage bin.

Figure 10:
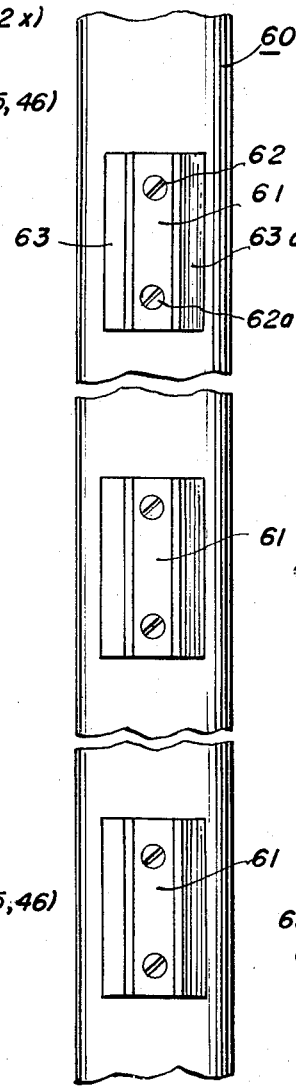
Fig. 10 is a broken-away elevation of a mounting for a plurality of temperature sensitive heads arranged at different levels in a bin, for example, as employed in a permanently installed form of temperature measuring and indicating means according to the invention.
Figure 11:
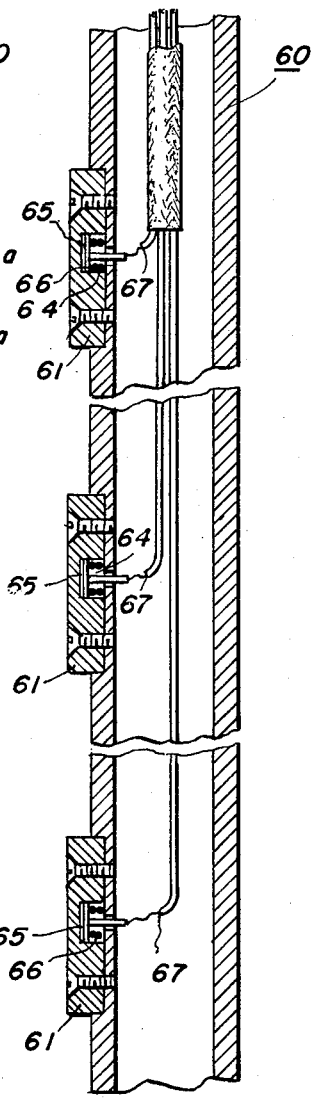
Fig. 11 is a section taken on line 11—11 of Fig. 10.

Referring to Figs. 10 and 11, only one of the permanent installation type heads will be described in detail since the construction of all heads of a bin unit or assembly thereof is the same. Reference numeral 60 designates a permanently mounted or suspended steel tube (corresponding to the pipe 11 of the portable probe 10) strategically located in a bin. At a selected elevation, a temperature sensitive block or bar 61 (corresponding to the previously described head 13) is secured to the external surface of the pipe so as to protrude outwardly therefrom, the block being made from a good heat-conducting metal such as copper, aluminum or brass. Illustratively, said block 61 is secured to the tube by screws 62, 62a and it may also be held along its side edges by side angles or brackets 63, 63a. On its under face, the block is provided with a recess 64, in which is contained a thermistor 65 (corresponding to the previously described thermistor 20). Said thermistor is held in physical contact with the end wall of the recess as by a spring 66. One lead 67 of an electrical circuit individual to the thermistor is connected thereto, the return side being either the other lead of a twin conductor or the steel pipe 60. It will be understood that the level of the temperature sensitive block 61 is such that it is buried in the grain or other material in the bin, so that its temperature corresponds closely to that of the temperature obtaining within the grain mass. By mounting a plurality of the temperature sensitive heads 61 to the tube 60 at different elevations within the bin, for example, at six foot intervals, the temperature obtaining at a critical level or at all levels of the grain mass may be obtained and logged.

For commercial mill or grain elevator use, a console type of indicating meter and appropriate electrical connections to the plurality of the temperature measuring units individual to the bins being monitored is recommended. Such is diagrammatically shown in Fig. 12, from which it will be seen that the meter circuit is essentially the same as that illustrated in Fig. 6, the difference being that instead of being provided with a receptacle for a plug such as the previously described plug 34, it instead incorporates a multiple-contact switch 70 for selectively connecting the measuring units, i.e. tube 60 and plurality of temperature sensitive heads 61 mounted thereon, to the meter; and it also includes multiple-contact switches 71, 72, 73, 74, each individual to a measuring unit, for selecting the level of an individual bin at which a temperature reading is to be taken. While four measuring units, and the contacts and connections for readings at six levels per measuring unit, have been illustrated, it will be understood that such is given for disclosure purposes and not by way of limitation.

From the above, it will be clear that the various forms of temperature measuring and indicating means as illustrated and described achieve the objectives of the present invention as earlier explained. However, as many changes could be made in carrying out the above constructions without departing from the scope of the invention, it is intended that all matter contained in the above description or shown in the accompanying drawing shall be interpreted as illustrative and not in a limiting sense.

I claim:

1. Electrical means for measuring the temperature within a mass of bulk material and for indicating the same at a distance comprising, in combination: an elongated tubular member adapted to extend within said mass of material; a temperature sensitive head affixed to said member and being thereby positionable in said mass of material, said head comprising a unitary sub-assembly of a body member having an internal space, a waferform thermistor disposed in said space, a filling of electrically non-conductive cementitious material in said space partially embedding and securing the thermistor in place within said body member and in heat exchange relation with said material, and electric leads to said thermistor; and electric circuit means including said thermistor and indicator means located remote from said head for measuring and indicating temperature changes in said material.

2. Electrical temperature measuring and indicating means as set forth in claim 1, wherein said elongated tubular member comprises a probe adapted to be manually inserted into the mass of material at any desired level thereof, and said temperature measuring head is mounted at the tip end of said probe.

3. Electrical temperature measuring and indicating means as set forth in claim 2, wherein said probe member is of sectional construction.

4. Electrical temperature measuring and indicating means as set forth in claim 1, wherein said elongated tubular member comprises a probe of sectional construction, the adjacent ends of the tip-end and handle-end sections having male and female connectors, respectively, and the remaining sections each having a male connector at one end and a female connector at the other end, said connectors adapted to complete a circuit through the electrical circuit means extending to the thermistor.

5. Electrical temperature measuring and indicating means as set forth in claim 1, wherein said elongated tubular member is stationary and extends substantially vertically into the mass of material and said temperature measuring head is one of a plurality of such heads mounted at different vertical levels on said tubular member.

6. Electrical means for measuring the temperature within a plurality of masses of bulk material in storage in bins, piles and the like and for indicating same at a distance comprising, in combination, a plurality of electrical measuring units, there being one such unit for each mass of material and each said unit including a plurality of temperature measuring heads mounted at different levels within the mass and each including a body member having an internal space, a thermistor contained in said space, a filling of electrically non-conductive cementitious material in said space substantially embedding and securing said thermistor in place therein and in heat exchange relationship with the material of a mass, a temperature indicating means located at a distance from the masses of material, and electrical circuit means for completing circuits through any selected one of said measuring units and through any selected head of said one unit and said temperature indicating means.

7. Electrical means for measuring the temperature within a plurality of masses of bulk material in storage in bins, piles and the like and for indicating same at a distance comprising, in combination, a plurality of electrical measuring units, there being one such unit for each mass of material and each said unit including a plurality of temperature measuring heads mounted at different levels within the mass and each including a body member having an internal space, a thermistor contained in said space, a filling of electrically non-conductive cementitious material in said space substantially embedding and securing said thermistor in place therein and in heat exchange relationship with the material of a mass, a temperature indicating means located at a distance from the masses of material, normally open circuits between said temperature indicating means and the individual temperature sensitive heads of each of said measuring units, and switch means for selectively closing any one of said circuits thereby to obtain a temperature indication at any desired level of a particular mass of material.

References Cited in the file of this patent

UNITED STATES PATENTS

| | | |
|---|---|---|
| 1,224,385 | Kennedy | May 1, 1917 |
| 2,131,065 | Obermaier | Sept. 27, 1938 |
| 2,271,975 | Hall | Feb. 3, 1942 |
| 2,444,410 | Keinath | June 29, 1948 |
| 2,635,137 | Basham | Apr. 14, 1953 |
| 2,734,382 | Wassmer | Feb. 14, 1956 |

FOREIGN PATENTS

| | | |
|---|---|---|
| 3,155 | Great Britain | Mar. 6, 1886 |